United States Patent
Jung et al.

(10) Patent No.: US 7,777,464 B2
(45) Date of Patent: Aug. 17, 2010

(54) MIXED TYPE FREQUENCY COMPENSATING CIRCUIT AND CONTROL CIRCUIT

(75) Inventors: Sang-Hwa Jung, Seoul (KR);
Dong-Hee Kim, Gyeonggi-do (KR);
Kyung-Goo Lee, Incheon (KR);
Dong-Hoon Lee, Gyeongbuk (KR)

(73) Assignee: Fairchild Korea Semiconductor, Ltd., Bucheon-Si (KR)

( * ) Notice: Subject to any disclaimer, the term of this patent is extended or adjusted under 35 U.S.C. 154(b) by 456 days.

(21) Appl. No.: 11/805,872

(22) Filed: May 24, 2007

(65) Prior Publication Data
US 2007/0273414 A1 Nov. 29, 2007

(30) Foreign Application Priority Data
May 24, 2006 (KR) .................. 10-2006-0046490

(51) Int. Cl.
*G05F 1/565* (2006.01)
(52) U.S. Cl. .................................................... 323/275
(58) Field of Classification Search ......... 323/275–277, 323/280, 285; 363/39
See application file for complete search history.

(56) References Cited

U.S. PATENT DOCUMENTS

| | | | | |
|---|---|---|---|---|
| 4,823,070 A | * | 4/1989 | Nelson | 323/285 |
| 5,220,272 A | * | 6/1993 | Nelson | 323/282 |
| 6,181,120 B1 | * | 1/2001 | Hawkes et al. | 323/282 |
| 6,795,265 B2 | * | 9/2004 | Murphy et al. | 360/77.02 |
| RE38,780 E | * | 8/2005 | Hawkes et al. | 323/282 |
| RE38,906 E | * | 12/2005 | Hawkes et al. | 323/282 |
| RE39,065 E | * | 4/2006 | Nelson | 323/284 |
| 7,230,406 B2 | * | 6/2007 | Huang et al. | 323/222 |
| 7,268,524 B2 | * | 9/2007 | Kase et al. | 323/282 |
| 7,495,422 B2 | * | 2/2009 | Mok et al. | 323/280 |
| 2007/0285173 A1 | * | 12/2007 | Jung et al. | 330/302 |

* cited by examiner

*Primary Examiner*—Adolf Berhane
*Assistant Examiner*—Yemane Mehari
(74) *Attorney, Agent, or Firm*—Sidley Austin LLP

(57) ABSTRACT

A mixed type frequency compensating circuit is disclosed. The mixed type frequency compensating circuit includes an integral component sub-circuit of a voltage-amplifier-type frequency compensating circuit and a proportional component sub-circuit of a transconductance-amplifier-type frequency compensating circuit. The integral component sub-circuit amplifies an input voltage signal in a voltage mode. The proportional component sub-circuit amplifies the input voltage signal in a current mode. Accordingly, the mixed type frequency compensating circuit may occupy a small area in a semiconductor integrated circuit.

24 Claims, 11 Drawing Sheets

210a

210b

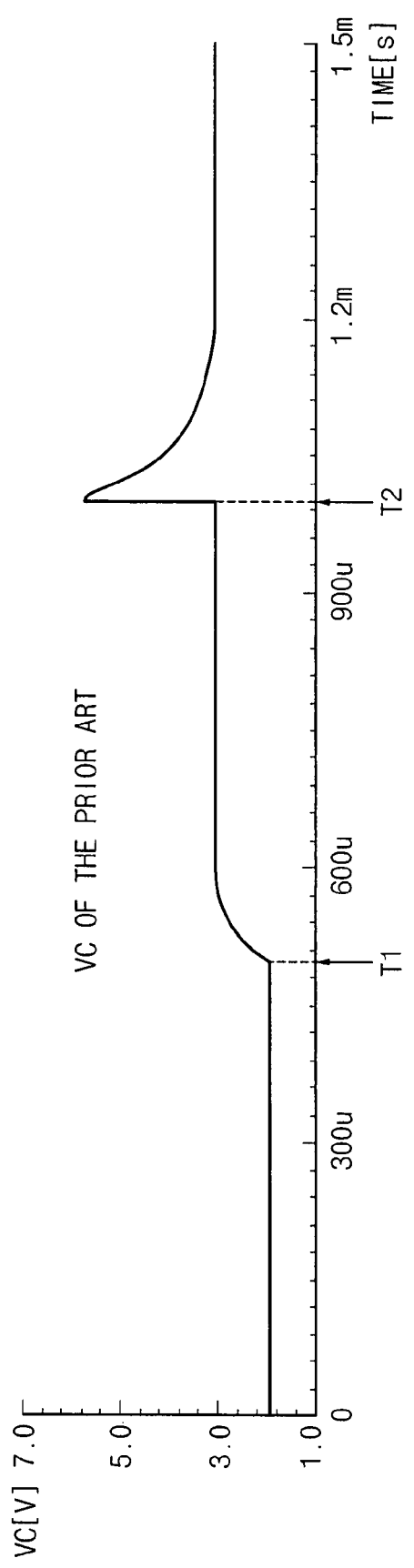

//, 777,464 B2

MIXED TYPE FREQUENCY COMPENSATING CIRCUIT AND CONTROL CIRCUIT

CROSS-REFERENCE TO RELATED APPLICATIONS

This application claims priority under 35 USC §119 from Korean Patent Application No. 10-2006-46490, filed on May 24, 2006, in the Korean Intellectual Property Office, the entire content of which is hereby incorporated by reference.

BACKGROUND

1. Field of the Invention

The present invention relates to a frequency compensating circuit, and more particularly to a mixed type frequency compensating circuit.

2. Description of the Related Art

FIG. 1 is a circuit diagram illustrating a conventional DC-DC converter 100 including a voltage-amplifier-type frequency compensating circuit. The DC-DC converter 100 is a buck-type DC-DC converter that generates a DC output voltage lower than a DC input voltage.

The DC-DC converter 100 can include a DC voltage source VS, a switching transistor MN1, a diode D1, an inductor L1, a capacitor C1, a resistor RL, a frequency compensating circuit 110, a current detecting circuit 120, a comparator 130, an RS-type flip-flop 140, and a buffer 150.

The switching transistor MN1 can be driven in response to a gate driving signal VG, and provides the input voltage VIN to a node N11. The diode D1 can have a cathode coupled to the node N11 and an anode coupled to the ground voltage GND. The inductor L1 can be coupled between the node N11 and an output node N12. The capacitor C1 can be coupled to the output node N12 and the ground voltage GND. The resistor RL can be a load resistor, and coupled between the output node N12 and the ground voltage GND.

The frequency compensating circuit 110, the current detecting circuit 120, the comparator 130, the RS-type flip-flop 140, and a buffer 150 constitute a control circuit that can drive the switching transistor MN1 included in the DC-DC converter 100. The control circuit can generate a gate driving signal VG and provide the gate driving signal VG to a gate of the switching transistor MN1.

The frequency compensating circuit 110 can include an operational amplifier 111, feedback resistors RF1 and RF2, resistors RC1 and RC2, and a capacitor CC1. The frequency compensating circuit 110 can be a voltage-amplifier-type frequency compensating circuit, and amplify the feedback voltage signal VFB to generate a compensating voltage signal VC.

The current detecting circuit 120 can detect a current flowing through the switching transistor MN1 to generate a detecting voltage signal VSEN1. The comparator 130 can compare the compensating voltage signal VC with the detecting voltage signal VSEN1. An output signal of the comparator 130 can be applied to a reset terminal of the RS-type flip-flop 140, and a clock signal CLK to a set terminal of the RS-type flip-flop 140. The RS-type flip-flop 140 can perform pulse-width modulation on the output signal of the comparator 130. The buffer 150 can buffer an output signal of the RS-type flip-flop 140 to generate a gate driving signal VG. The gate driving signal VG can be applied to a gate of the switching transistor MN1.

The frequency compensating circuit 110 included in the DC-DC converter 100 can be a voltage-amplifier-type frequency compensating circuit. The capacitor CC1, that is inserted to compensate for a frequency characteristics, can have a small capacitance. The resistor RC1 can have a large resistance. For example, capacitor CC1 may have a capacitance of 10 pF and resistor RC1 may have a resistance of 15.9 MΩ. Capacitors with a capacitance of only 10 pF can be included in conventional semiconductor integrated circuits, because they require a relatively small chip area. However, it is difficult to include a resistor having a resistance of 15.9 MΩ in the semiconductor integrated circuit because such resistors occupy a larger chip area of the semiconductor integrated circuit.

The voltage-amplifier-type frequency compensating circuit 110 may be considered as a superposed circuit of an integral component sub-circuit 110a shown in FIG. 2A and a proportional component sub-circuit 110b shown in FIG. 2B.

In the integral component sub-circuit 110a, a capacitor CC1 can be coupled between an output terminal of the operational amplifier 11 and an inverted input terminal, but the resistor RC1 is absent. In the proportional component sub-circuit 110b, a resistor RC1 can be coupled between the output terminal of the operational amplifier 111 and the inverted input terminal, but the capacitor CC1 is absent.

FIG. 2C is a graph illustrating a voltage gain AV as a function of a frequency of the frequency compensating circuit 110 of FIG. 1. At low frequencies the voltage gain AV is approximately equal to a value Ao. For frequencies above a pole frequency fp the voltage gain AV decreases. Finally, above a zero frequency fz the voltage gain AV levels off at a value of RC1/RC2. The pole frequency fp may be expressed as $fp=1/(2\pi \cdot Ao \cdot RC2 \cdot CC1)$, and the zero frequency fz may be represented as $fz=1/(2\pi \cdot RC1 \cdot CC1)$. Here, Ao denotes an open loop gain of the operational amplifier 111.

FIG. 3 illustrates a circuit diagram of a transconductance-amplifier-type frequency compensating circuit 210. The transconductance-amplifier-type frequency compensating circuit 210 may be used instead of the voltage-amplifier-type frequency compensating circuit 110 of FIG. 1.

The transconductance-amplifier-type frequency compensating circuit 210 may include a transconductance amplifier 211, feedback resistors RF1 and RF2, a resistor RC3, and a capacitor CC3. The feedback voltage VFB may be an output voltage VOUT of a DC-DC converter that is divided by the feedback resistors RF1 and RF2. The first transconductance amplifier 210 is a transconductance-amplifier-type frequency compensating circuit, and amplifies the feedback voltage signal VFB to generate a compensating voltage signal VC.

The resistor RC3, inserted to compensate for a frequency characteristics, can have a small resistance, but the capacitor CC3 can have a large capacitance. For example, RC3 may have a resistance of 191 kΩ and CC3 may have a capacitance of 830 pF. It is possible to include a resistor having a resistance of 191 kΩ in a semiconductor integrated circuit. However, it is more challenging to include a capacitor having a capacitance of 830 pF in the semiconductor integrated circuit because the capacitor occupies a large chip area of the semiconductor integrated circuit.

The transconductance-amplifier-type frequency compensating circuit 210 may be considered as a superposed circuit of an integral component sub-circuit 210a shown in FIG. 4A and a proportional component sub-circuit 210b shown in FIG. 4B.

In the integral component sub-circuit 210a, a capacitor CC3 can be coupled between an output terminal of the transconductance amplifier 211 and the ground voltage GND, but the resistor RC3 is absent. In the proportional component sub-circuit 210b, a resistor RC3 can be coupled between the output terminal of the transconductance amplifier 211 and the ground voltage, but the capacitor CC3 is absent.

FIG. 5 is a graph illustrating voltage gain AV as a function of a frequency of the frequency compensating circuit 210 shown in FIG. 3. At low frequencies the voltage gain AV is approximately gm·ro. Above a pole frequency fp the voltage gain AV decreases. Finally, above a higher zero frequency fz the voltage gain AV levels off with an approximate value of gm·RC3. The pole frequency fp may be expressed as fp=1/(2π·ro·CC3), and the zero frequency fz may be represented as fz=1/(2π·RC3·CC3). Here, gm denotes a transconductance of the transconductance amplifier 211, and ro denotes an output resistance of the transconductance amplifier 211.

In some conventional transconductance-amplifier-type frequency compensating circuits 210 the zero frequency fz is about 1 kHz when the transconductance gm of the transconductance amplifier 211 is about $200 \cdot 10^{-6}$ A/V, RC3 is about 191 kΩ and CC3 is about 830 pF. The voltage gain AV may be expressed as gm·RC3, and has a value of about 31.6 dB (=20×log 38) at this zero frequency fz=1 kHz.

As described above, the compensating resistor RC1 included in the voltage-amplifier-type frequency compensating circuit 110 shown in FIG. 1 may have a resistance of about 15.9 MΩ. A lot of chip area is needed to implement a resistor having such a large resistance in the semiconductor integrated circuit. Further, the compensating capacitor CC3 included in the transconductance-amplifier-type frequency compensating circuit 210 shown in FIG. 3 may have a capacitance of about 830 pF. A lot of chip area is needed to implement a capacitor having such a large capacitance in the semiconductor integrated circuit.

Therefore, a frequency compensating circuit is needed, which may include a capacitor and a resistor, which can be integrated onto a smaller chip area in a semiconductor integrated circuit.

SUMMARY

Briefly and generally, embodiments of the present invention include a mixed type frequency compensating circuit, comprising an integral component sub-circuit of a voltage-amplifier-type frequency compensating circuit configured to amplify an input voltage signal in a voltage mode and configured to perform a voltage regulation of the whole loop, and a proportional component sub-circuit of a transconductance-amplifier-type frequency compensating circuit configured to amplify the input voltage signal in a current mode and configured to increase a phase margin for stability.

In some embodiments the input voltage signal is generated based on an output voltage of a DC-DC converter.

Some embodiments include the proportional component sub-circuit comprising a transconductance amplifier configured to have a first input terminal to which the input voltage signal is applied, a second input terminal to which a reference voltage is applied, and configured to amplify the input voltage signal in a current mode to generate a first amplified signal and provide the first amplified signal to an output node, and a first resistor coupled between the output node and a first node.

In some embodiments the first resistor is configured to have a resistance less than or equal to 1 MΩ, and is configured to be includable in a semiconductor integrated circuit.

In some embodiments the integral component sub-circuit comprises a second resistor configured to have a first terminal to which the input voltage signal is applied, an operational amplifier configured to have a first input terminal coupled to a second terminal of the second resistor, a second input terminal to which the reference voltage is applied, and configured to amplify the input voltage signal in a voltage mode to generate a second amplified signal and provide the second amplified signal to the first node, and a first capacitor coupled between the first node and the first input terminal of the operational amplifier.

In some embodiments the first capacitor is configured to have a capacitance less than or equal to 100 pF, and is configured to be includable in a semiconductor integrated circuit.

Some embodiments further include a third resistor coupled between the first input terminal of the transconductance amplifier and a low supply voltage, and a fourth resistor having a first terminal coupled to the first input terminal of the transconductance amplifier and a second terminal to which the output voltage of the DC-DC converter is applied.

Some embodiments include a control circuit comprising a mixed type frequency compensating circuit configured to amplify a feedback voltage signal to generate a compensating voltage signal, a current detecting circuit configured to detect a current flowing through a switching transistor to generate a first detecting voltage signal, a comparator configured to compare a voltage level of the compensating voltage signal with a voltage level of the first detecting voltage signal to generate a comparing signal, and a pulse-width modulating circuit configured to generate a gate driving signal based on a clock signal and the comparing signal.

In some embodiments the pulse-width modulating circuit is configured to have a flip-flop.

Some embodiments further include a buffer configured to buffer an output signal of the pulse-width modulating circuit to generate the gate driving signal.

In some embodiments the mixed type frequency compensating circuit comprises an integral component sub-circuit of a voltage-amplifier-type frequency compensating circuit configured to amplify an input voltage signal in a voltage mode and configured to perform frequency compensation, and a proportional component sub-circuit of a transconductance-amplifier-type frequency compensating circuit configured to amplify an input voltage signal in a current mode and configured to perform frequency compensation.

In some embodiments the feedback voltage signal is generated based on an output voltage of a DC-DC converter.

In some embodiments the proportional component sub-circuit comprises a transconductance amplifier configured to have a first input terminal to which the input voltage signal is applied, a second input terminal to which a reference voltage is applied, and configured to amplify the input voltage signal in a current mode to generate a first amplified signal and provide the first amplified signal to the output node, and a first resistor coupled between the output node and a first node.

In some embodiments the first resistor is configured to have a resistance less than or equal to 1 MΩ, and is configured to be includable in a semiconductor integrated circuit.

In some embodiments the integral component sub-circuit comprises a second resistor configured to have a first terminal to which the input voltage signal is applied, an operational amplifier configured to have a first input terminal coupled to a second terminal of the second resistor, a second input terminal to which the reference voltage is applied, and configured to amplify the input voltage signal in a voltage mode to generate a second amplified signal and provide the second amplified signal to the first node, and a first capacitor coupled between the first node and the first input terminal of the operational amplifier.

In some embodiments the first capacitor is configured to have a capacitance less than or equal to 100 pF, and is configured to be includable in a semiconductor integrated circuit.

In some embodiments the mixed type frequency compensating circuit further comprises a third resistor coupled between the first input terminal of the transconductance amplifier and a low supply voltage, and a fourth resistor having a first terminal coupled to the first input terminal of the transconductance amplifier and a second terminal to which the output voltage of the DC-DC converter is applied.

Some embodiments include a DC-DC converter, comprising an input node to which a DC input voltage is applied, a switching transistor coupled between the input node and a first node, and configured to be driven in response to a gate driving signal, a diode configured to have a cathode coupled to the first node and an anode coupled to a first supply voltage, an inductor coupled between the first node and an output node, a first capacitor coupled between the output node and the first supply voltage, and a control circuit including a mixed type frequency compensating circuit, the control circuit generating the gate driving signal in response to a current flowing through the switching transistor, a voltage of the output node, and a clock signal.

In some embodiments the control circuit comprises a mixed type frequency compensating circuit configured to amplify a feedback voltage signal to generate a compensating voltage signal, a current detecting circuit configured to detect a current flowing through a switching transistor to generate a first detecting voltage signal, a comparator configured to compare a voltage level of the compensating voltage signal with a voltage level of the first detecting voltage signal to generate a comparing signal; and a pulse-width modulating circuit configured to generate a gate driving signal based on a clock signal and the comparing signal.

In some embodiments the pulse-width modulating circuit is configured to have a flip-flop.

In some embodiments the control circuit further comprises a buffer configured to buffer an output signal of the pulse-width modulating circuit to generate the gate driving signal.

In some embodiments the mixed type frequency compensating circuit comprises an integral component sub-circuit of a voltage-amplifier-type frequency compensating circuit configured to amplify an input voltage signal in a voltage mode and configured to perform frequency compensation, and an proportional component sub-circuit of a transconductance-amplifier-type frequency compensating circuit configured to amplify an input voltage signal in a current mode and configured to perform frequency compensation.

In some embodiments the proportional component sub-circuit comprises a transconductance amplifier configured to have a first input terminal to which the input voltage signal is applied, a second input terminal to which a reference voltage is applied, and configured to amplify the input voltage signal in a current mode to generate a first amplified signal and provide the first amplified signal to the output node, and a first resistor coupled between the output node and a first node.

In some embodiments the integral component sub-circuit comprises a second resistor configured to have a first terminal to which the input voltage signal is applied, an operational amplifier configured to have a first input terminal coupled to a second terminal of the second resistor, a second input terminal to which the reference voltage is applied, and configured to amplify the input voltage signal in a voltage mode to generate a second amplified signal and provide the second amplified signal to the first node and a first capacitor coupled between the first node and the first input terminal of the operational amplifier.

In some embodiments the mixed type frequency compensating circuit further comprises a voltage dividing circuit configured to divide a voltage of the output node to generate the feedback voltage signal.

Some embodiments include a method of controlling a mixed type frequency compensating circuit, the method comprising compensating a frequency characteristics of a feedback voltage signal using an integral component sub-circuit of a voltage-amplifier-type frequency compensating circuit, and compensating the frequency characteristics of the feedback voltage signal using a proportional component sub-circuit of a transconductance-amplifier-type frequency compensating circuit.

In some embodiments compensating the frequency characteristics of the feedback voltage signal using the integral component sub-circuit of the voltage-amplifier-type frequency compensating circuit comprises amplifying the feedback voltage signal in a voltage mode.

In some embodiments compensating the frequency characteristics of the feedback voltage signal using the proportional component sub-circuit of the transconductance-amplifier-type frequency compensating circuit comprises amplifying the feedback voltage signal in a current mode.

Some embodiments include a method of controlling a DC-DC converter, the method comprising amplifying a feedback voltage signal in a voltage mode and in a current mode to generate a compensating voltage signal, detecting a current flowing through a switching transistor to generate a first detecting voltage signal, comparing a voltage level of the compensating voltage signal with a voltage level of the first detecting voltage signal to generate a comparing signal, generating a gate driving signal based on a clock signal and the comparing signal.

BRIEF DESCRIPTION OF THE DRAWINGS

FIG. 9A and FIG. 9B are graphs illustrating waveforms of an output signal of a frequency compensating circuit according to the prior art and the present invention, respectively.

DETAILED DESCRIPTION

Figure 1:
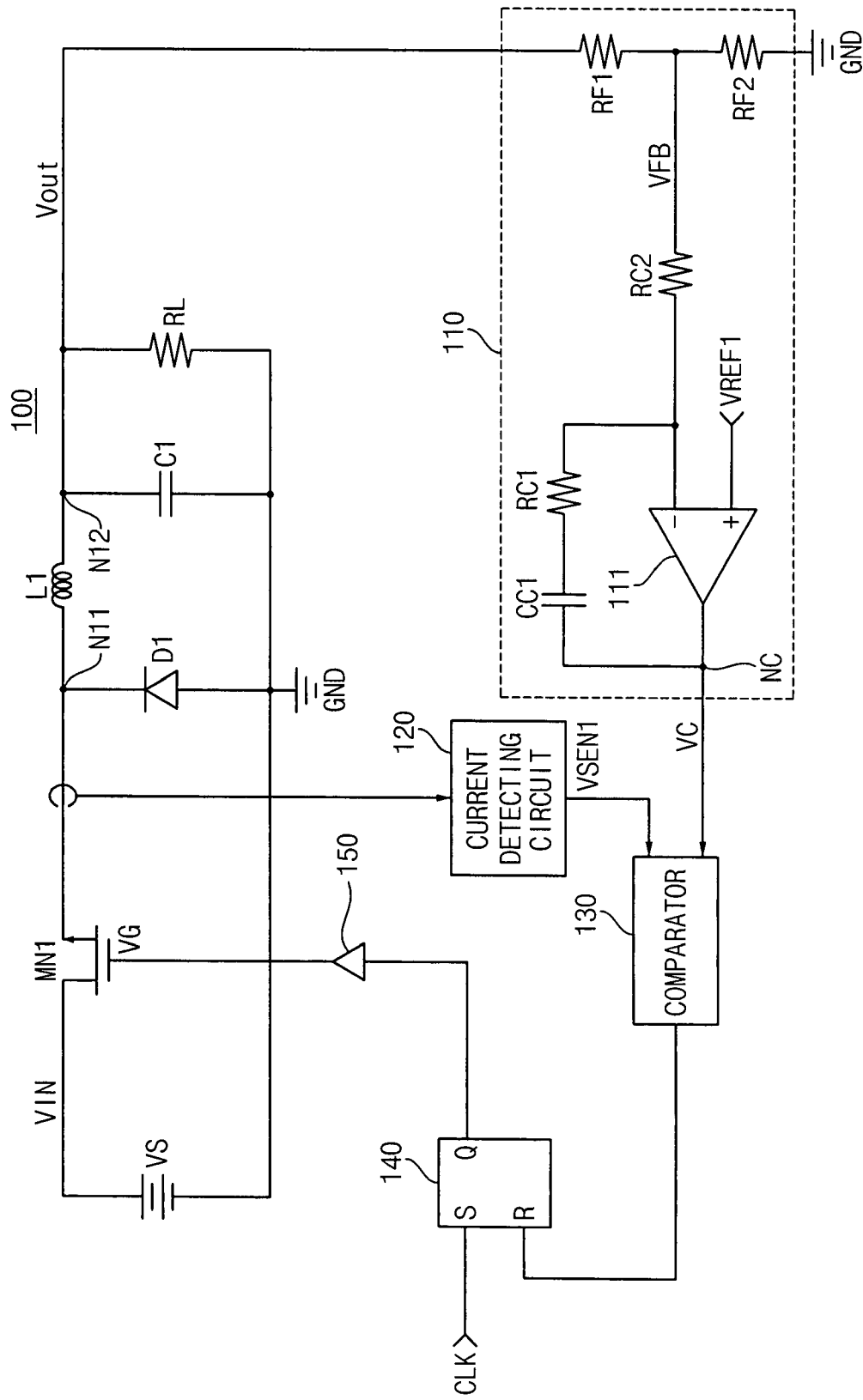
FIG. 1 is a circuit diagram illustrating a conventional DC-DC converter including a voltage-amplifier-type frequency compensating circuit.

Embodiments of the present invention now will be described more fully with reference to the accompanying drawings. However, the ideas can be embodied in many analogous systems, combinations and arrangements, all of which will be recognized by persons or ordinary skill in the art as belonging to the scope of the invention.

Like reference numerals refer to like elements throughout this application. The term "and/or" includes any and all combinations of one or more of the associated listed items. When an element is referred to as being "connected" or "coupled" to another element, it can be directly connected to the other element, or it can be coupled to the other element through intervening elements. Embodiments in which an element is referred to as being "directly connected" to another element, contain no intervening elements. Other words used to describe the relationship between elements should be interpreted in a like fashion (e.g., "between" versus "directly between," "adjacent" versus "directly adjacent," etc.).

Figure 6:
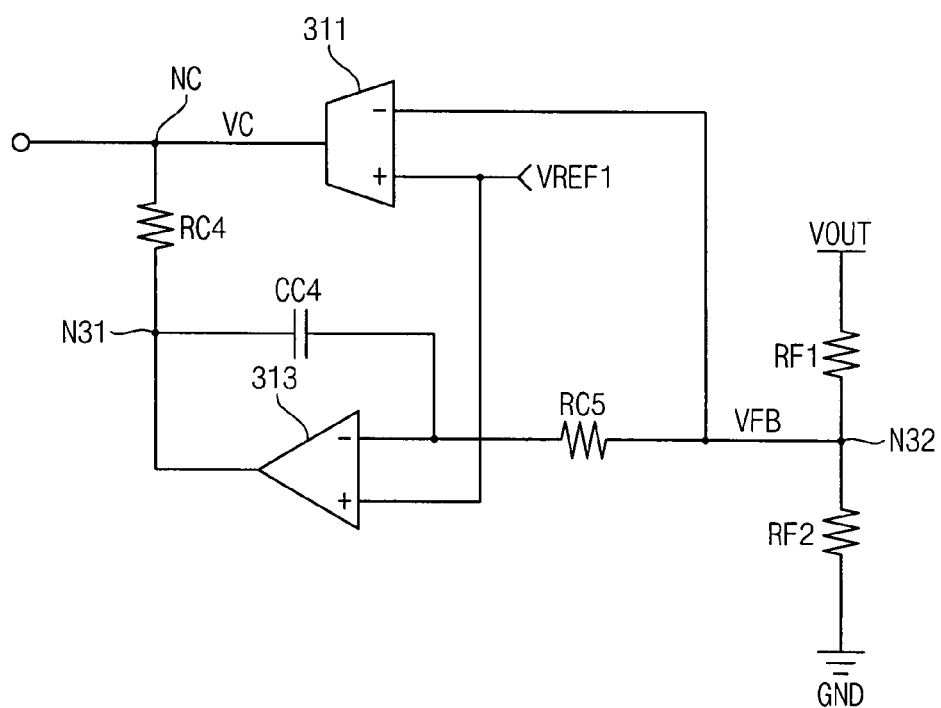
FIG. 6 is a circuit diagram illustrating a mixed type frequency compensating circuit according to an example embodiment of the present invention.

FIG. 6 illustrates a circuit diagram of a mixed type frequency compensating circuit 310. The mixed type frequency compensating circuit 310 can include a transconductance amplifier 311, a resistor RC4, an operational amplifier 313, a capacitor CC4, and a resistor RC5. The mixed type frequency compensating circuit 310 can also include a voltage divider, composed of feedback resistors RF1 and RF2, which can generate the feedback voltage signal VFB. The mixed type frequency compensating circuit 310 can amplify the feedback voltage signal VFB and perform a frequency compensation to generate a compensating voltage signal VC. The feedback voltage signal VFB may be an output voltage VOUT divided by the feedback resistors RF1 and RF2.

The transconductance amplifier 311 can have an inverting input terminal to which the feedback voltage signal VFB is applied, a non-inverting input terminal to which a reference voltage VREF1 is applied. The transconductance amplifier 311 can amplify the feedback voltage signal VFB in a current mode to generate a first amplified signal and provide the first amplified signal to the output node NC. The resistor RC4 can be coupled between the output node NC and a node N31. The resistor RC5 has a first terminal to which the feedback voltage signal VFB can be applied. The operational amplifier 313 has an inverting input terminal, which can be coupled to a second terminal of the second resistor RC5, a non-inverting input terminal to which the reference voltage VREF1 can be applied. The operational amplifier 313 can amplify the feedback voltage signal VFB in a voltage mode to generate a second amplified signal and provide the second amplified signal to the node N31. The first capacitor CC4 can be coupled between the node N31 and the inverting input terminal of the operational amplifier 313.

Figure 7:
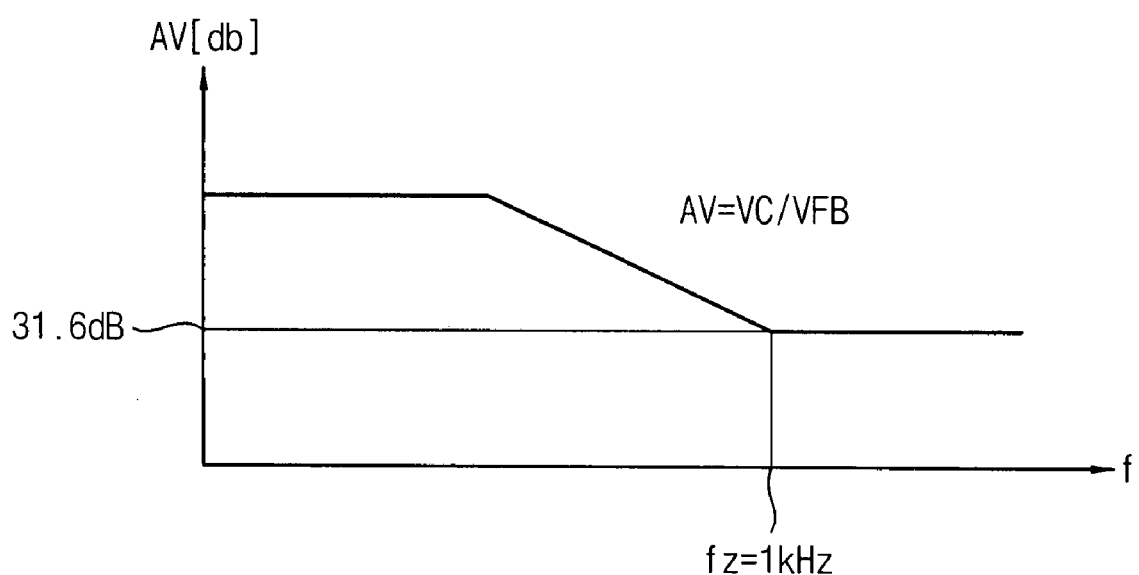
FIG. 7 is a graph illustrating voltage gain versus frequency of the mixed type frequency compensating circuit shown in FIG. 6.

FIG. 7 illustrates the voltage gain AV as a function of a frequency of the mixed type frequency compensating circuit 310, shown in FIG. 6. Next, an operation of the mixed type frequency compensating circuit 310 will be described with reference to FIG. 6 and FIG. 7.

Figure 2A:
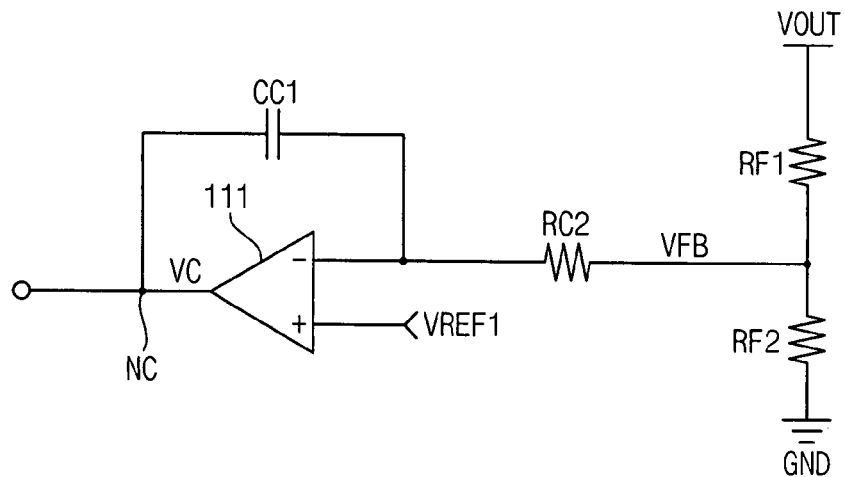
FIG. 2A is a circuit diagram illustrating an integral component sub-circuit of the voltage-amplifier-type frequency compensating circuit included in the DC-DC converter of FIG. 1.
Figure 2B:
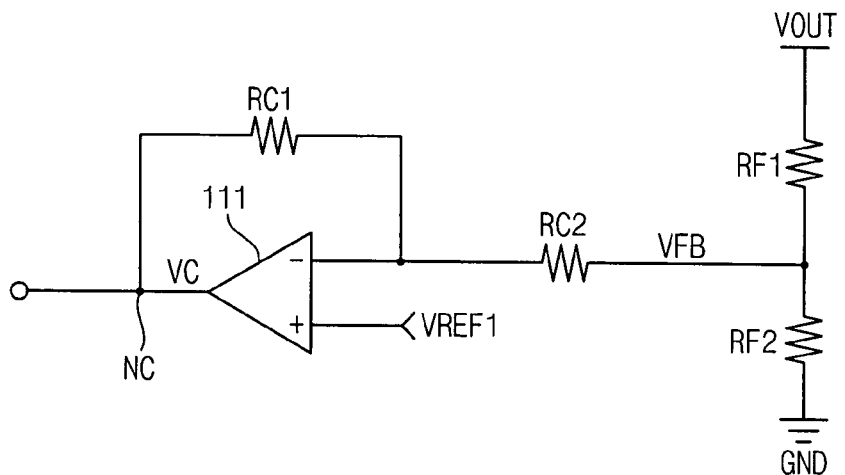
FIG. 2B is a circuit diagram illustrating a proportional component sub-circuit of the voltage-amplifier-type frequency compensating circuit included in the DC-DC converter of FIG. 1.
Figure 2C:
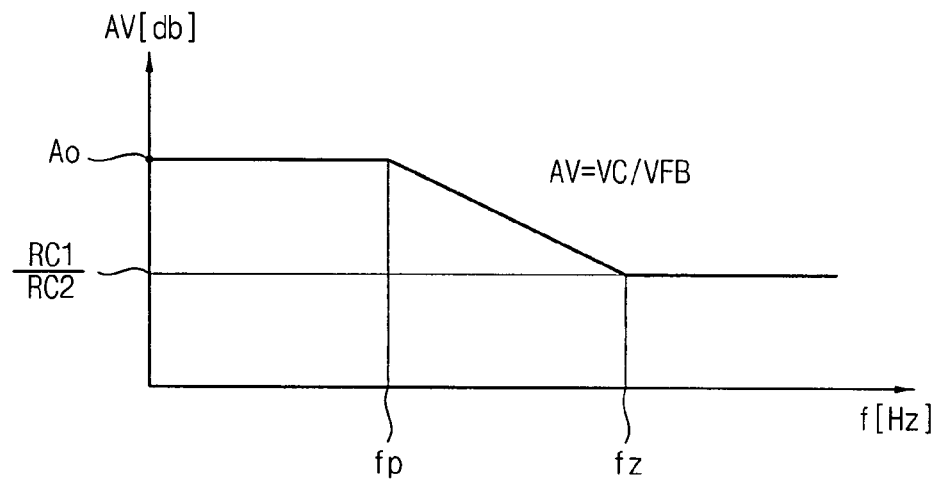
FIG. 2C is a graph illustrating voltage gain versus frequency of a frequency compensating circuit included in the DC-DC converter of FIG. 1.
Figure 4A:
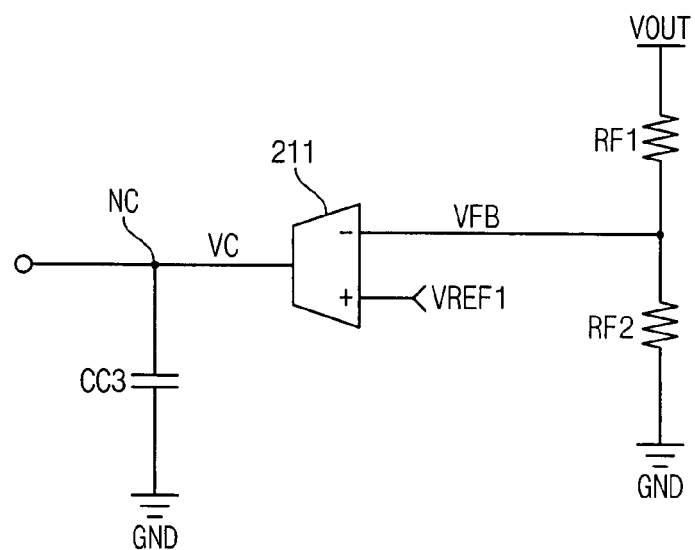
FIG. 4A is a circuit diagram illustrating an integral component sub-circuit of the transconductance-amplifier-type frequency compensating circuit shown in FIG. 3.
Figure 4B:
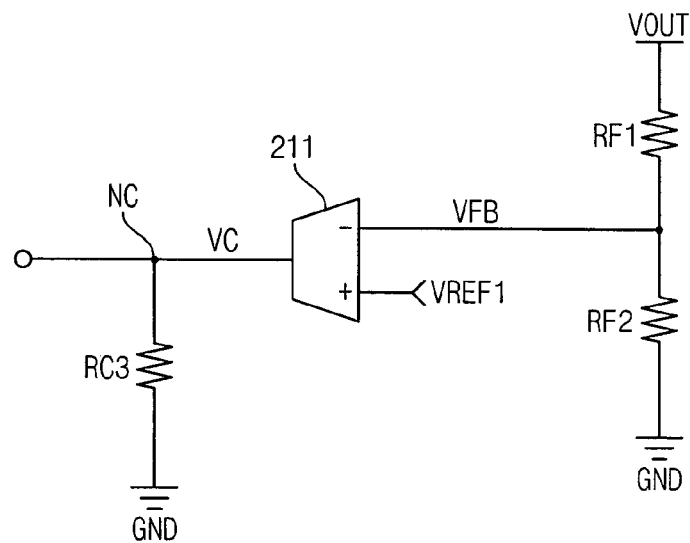
FIG. 4B is a circuit diagram illustrating a proportional component sub-circuit of the transconductance-amplifier-type frequency compensating circuit shown in FIG. 3.
Figure 5:
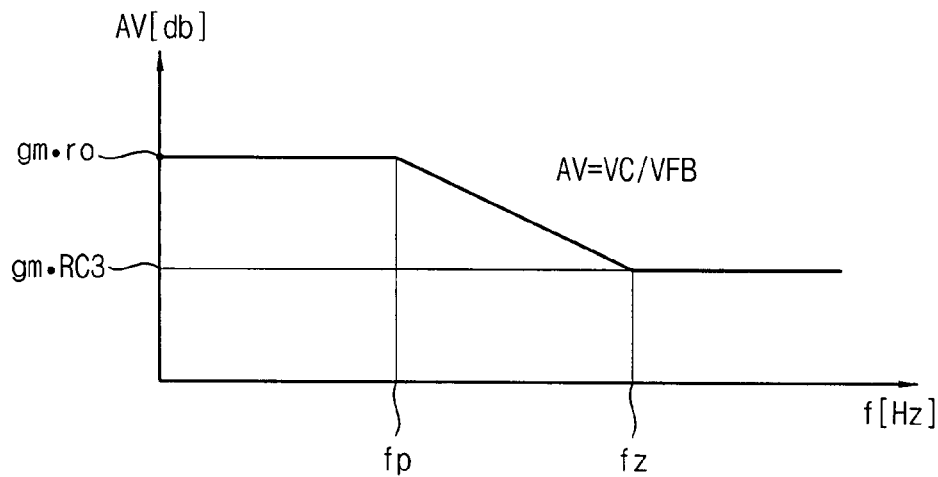
FIG. 5 is a graph illustrating voltage gain versus frequency of a frequency compensating circuit shown in FIG. 3.

The mixed type frequency compensating circuit 310 of FIG. 6 can be a superposed circuit of the integral component sub-circuit 110a shown in FIG. 2A and a proportional component sub-circuit 210b shown in FIG. 4B. That is, the mixed type frequency compensating circuit 310 of FIG. 6 can include an integral component sub-circuit of the voltage-amplifier-type frequency compensating circuit 110 and a proportional component sub-circuit of the transconductance-amplifier-type frequency compensating circuit 210. The integral component sub-circuit of the voltage-amplifier-type frequency compensating circuit 110 can amplify the feedback voltage signal VFB in a voltage mode and can perform frequency compensation. The proportional component sub-circuit of the transconductance-amplifier-type frequency compensating circuit 210 can amplify the feedback voltage signal VFB in a current mode and can perform frequency compensation.

The pole frequency fp of the mixed type frequency compensating circuit 310 of FIG. 6 is mainly determined by the integral component sub-circuit of the voltage-amplifier-type frequency compensating circuit 110. The zero frequency fz of the mixed type frequency compensating circuit 310 of FIG. 6 is mainly determined by the integral component sub-circuit of the voltage-amplifier-type frequency compensating circuit 110 and the proportional component sub-circuit of the transconductance-amplifier-type frequency compensating circuit 210.

The transconductance amplifier 311 and the resistor RC4 can constitute the proportional component sub-circuit of the transconductance-amplifier-type frequency compensating circuit 210. The operational amplifier 313, the resistor RC5, and the capacitor CC4 can constitute the integral component sub-circuit of the voltage-amplifier-type frequency compensating circuit 110.

As described above, the resistor RC3 in the transconductance-amplifier-type frequency compensating circuit 210, to compensate for a frequency characteristics, can have a small resistance, but the capacitor CC3 can have a large capacitance. For example, RC3 may have a resistance of 191 kΩ and CC3 may have a capacitance of 830 pF. As mentioned earlier, it is possible to include a resistor having a resistance of 191 kΩ in a semiconductor integrated circuit, but it is difficult to include a capacitor having a capacitance of 830 pF in the semiconductor integrated circuit because such a capacitor occupies a large chip area of the semiconductor integrated circuit.

The capacitor CC1, in the voltage-amplifier-type frequency compensating circuit 110 to compensate for a frequency characteristics, can have a small capacitance, but the resistor RC1 can have a large resistance. For example, CC1 may have a capacitance of 10 pF and RC1 may have a resistance of 15.9 MΩ. Therefore, it is possible to include the capacitor CC1 in the voltage-amplifier-type frequency compensating circuit 110 in a semiconductor integrated circuit, but it is difficult to include the resistor RC1 in the semiconductor integrated circuit because the resistor occupies a large chip area of the semiconductor integrated circuit.

The mixed type frequency compensating circuit 310 shown in FIG. 6 is a superposed circuit of the integral component sub-circuit of the voltage-amplifier-type frequency compensating circuit and a proportional component sub-circuit of the transconductance-amplifier-type frequency compensating circuit. Therefore, the capacitor CC4 in the mixed type frequency compensating circuit 310 can have a small capacitance, but the resistor RC4 can have a large resistance. For example, CC4 may have a capacitance of 10 pF and RC4 may have a resistance of 191 kΩ. Therefore, both the capacitor CC4 and the resistor RC4 may be included in a semiconductor integrated circuit.

Figure 3:
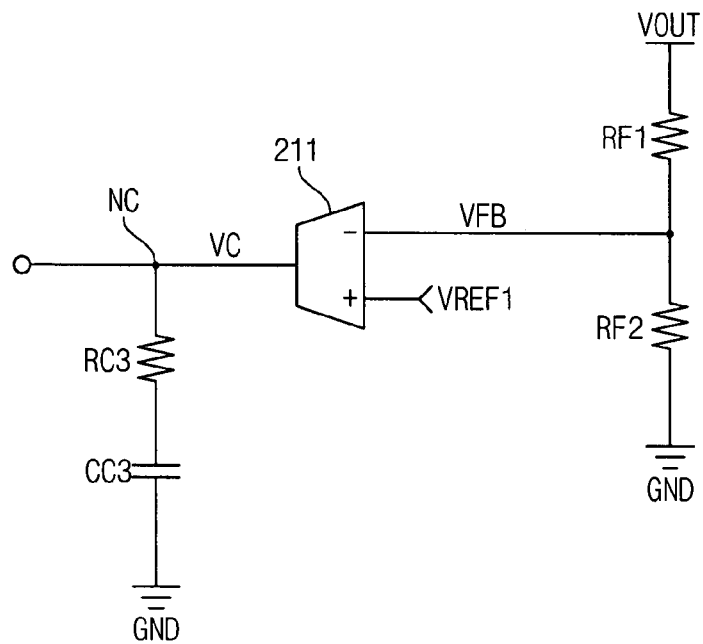
FIG. 3 is a circuit diagram illustrating a transconductance-amplifier-type frequency compensating circuit.

As illustrated in FIG. 7, the voltage gain AV may have a value of about 31.6 dB(=20×log 38) at fz=1 kHz. Therefore, the frequency characteristics such as the voltage gain plot of the mixed type frequency compensating circuit 310 shown in FIG. 6 is similar to the frequency characteristics of the voltage-amplifier-type frequency compensating circuit 110 shown in FIG. 1 or the frequency characteristics of the transconductance-amplifier-type frequency compensating circuit 210 shown in FIG. 3.

Figure 8:
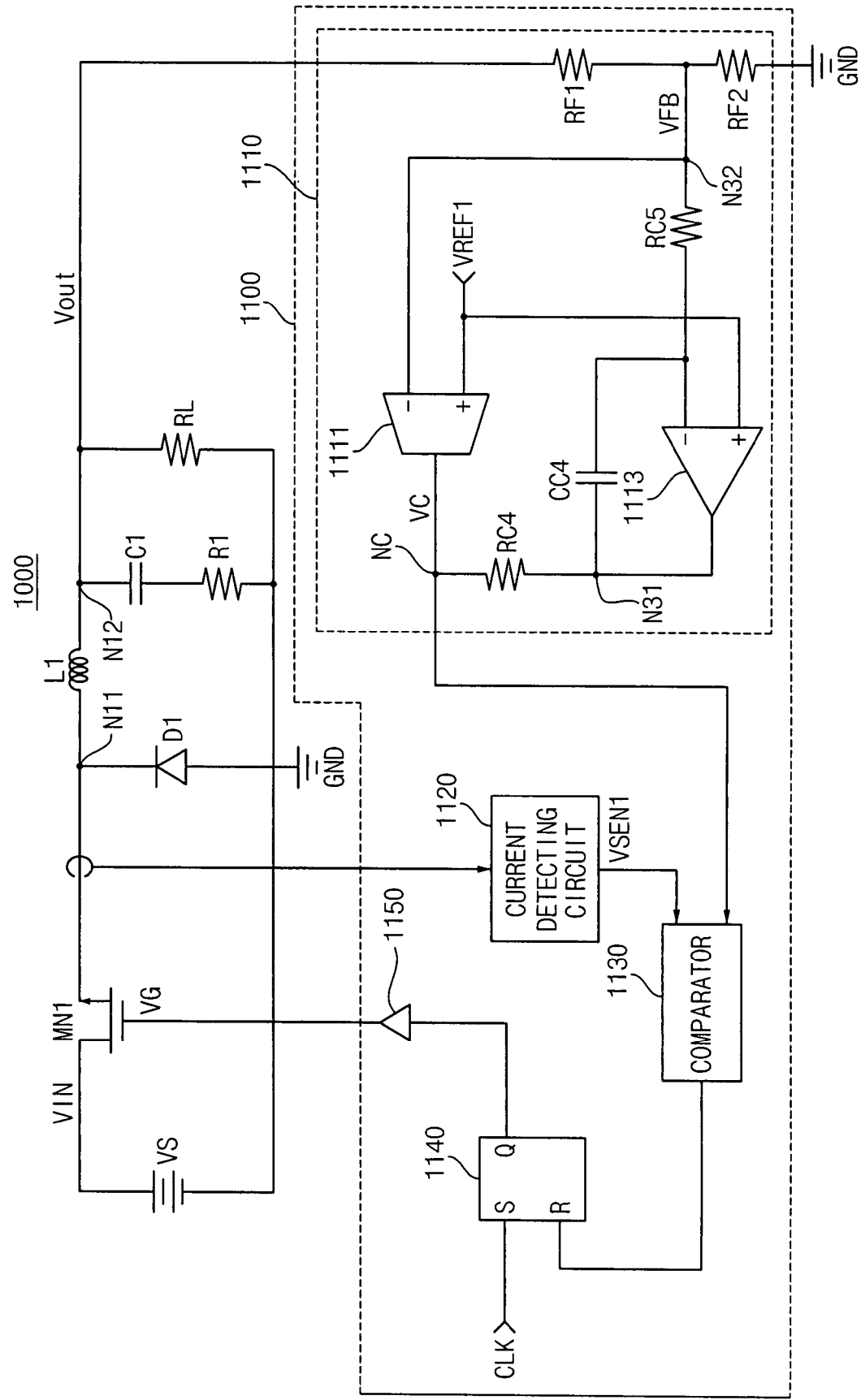
FIG. 8 is a DC-DC converter including the mixed type frequency compensating circuit of FIG. 6.

FIG. 8 is a DC-DC converter 1000 including the mixed type frequency compensating circuit 310 of FIG. 6. The DC-DC converter 1000 is a buck-type DC-DC converter that generates a DC output voltage VOUT which is lower than a DC input voltage VIN. The DC-DC converter 1000 can include a DC voltage source VS, a switching transistor MN1, a diode D1, an inductor L1, a capacitor C1, resistors R1 and RL, and a control circuit 1100.

The switching transistor MN1 can be driven in response to a gate driving signal VG, and can provide the input voltage VIN to a node N11. The diode D1 can have a cathode coupled to the node N11 and an anode coupled to the ground voltage GND. The inductor L1 can be coupled between the node N11 and an output node N12. A first terminal of the capacitor C1 can be coupled to the output node N12. The resistor R1 can be coupled between a second terminal of the capacitor C1 and the ground voltage GND. The resistor RL can be a load resistor, and coupled between the output node N12 and the ground voltage GND.

The control circuit 1100 can include a mixed type frequency compensating circuit 1110, a current detecting circuit 1120, a comparator 1130, an RS-type flip-flop 1140, and a buffer 1150.

The mixed type frequency compensating circuit 1110 can include a transconductance amplifier 1111, a resistor RC4, an operational amplifier 1113, a capacitor CC4, and a resistor RC5. The mixed type frequency compensating circuit 1110 can also include a voltage divider that includes feedback resistors RF1 and RF2 and can generate the feedback voltage signal VFB. The mixed type frequency compensating circuit 1110 can amplify the feedback voltage signal VFB and can perform frequency compensation to generate a compensating voltage signal VC.

The mixed type frequency compensating circuit 1110 can include an integral component sub-circuit of a voltage-amplifier-type frequency compensating circuit that amplifies the feedback voltage signal VFB in a voltage mode and performs frequency compensation, and a proportional component sub-circuit of a transconductance-amplifier-type frequency compensating circuit that amplifies the feedback voltage signal in a current mode and performs frequency compensation. The transconductance amplifier 311 and the resistor RC4 can constitute the proportional component sub-circuit of the transconductance-amplifier-type frequency compensating circuit. The operational amplifier 313, the resistor RC5, and the capacitor CC4 can constitute the integral component sub-circuit of the voltage-amplifier-type frequency compensating circuit.

The pole frequency fp of the mixed type frequency compensating circuit 1110 of FIG. 6 can be mainly determined by the integral component sub-circuit of the voltage-amplifier-type frequency compensating circuit. The zero frequency fz of the mixed type frequency compensating circuit 1110 of FIG. 6 can be mainly determined by the integral component sub-circuit of the voltage-amplifier-type frequency compensating circuit and the proportional component sub-circuit of the transconductance-amplifier-type frequency compensating circuit.

The transconductance amplifier 1111 can have an inverting input terminal to which the feedback voltage signal VFB is applied, and a non-inverting input terminal to which a reference voltage VREF1 is applied. The transconductance amplifier 1111 can amplify the feedback voltage signal VFB in a current mode to generate a first amplified signal and provide the first amplified signal to the output node NC. The resistor RC4 can be coupled between the output node NC and a node N31. The resistor RC5 has a first terminal to which the feedback voltage signal VFB is applied. The operational amplifier 1113 has an inverting input terminal, which can be coupled to a second terminal of the resistor RC5, a non-inverting input terminal to which the reference voltage VREF1 can be applied. The operational amplifier 1113 can amplify the feedback voltage signal VFB in a voltage mode to generate a second amplified signal and provide the second amplified signal to the node N31. The capacitor CC4 can be coupled between the node N31 and the inverting input terminal of the operational amplifier 1113.

The current detecting circuit 1120 can detect a current flowing through the switching transistor to generate a detecting voltage signal VSEN1. The comparator 1130 can compare the compensating voltage signal VC with the detecting voltage signal VSEN1. An output signal of the comparator 1130 can be applied to a reset terminal of the RS-type flip-flop 1140, and a clock signal CLK can be applied to a set terminal of the RS-type flip-flop 1140. The RS-type flip-flop 1140 can perform pulse-width modulation on the output signal of the comparator 1130. The buffer 1150 can buffer an output signal of the RS-type flip-flop 1140 to generate a gate driving signal VG. The gate driving signal VG can be applied to a gate of the switching transistor MN1.

Hereinafter, operations of the DC-DC converter 1000 will be described with reference to FIG. 8. When the switching transistor MN1 is turned on, a current corresponding to the DC input voltage VIN can flow through the inductor L1 to the capacitor C1 and the resistor RL. When the switching transistor MN1 is turned off, the diode D1 can be turned on, and the current that has been flowing through the inductor L1 flows through the loop that is comprised of the diode D1, the inductor L1, the capacitor C1, and the resistor R1. The switching transistor MN1 can operate in response to the gate driving signal VG.

The control circuit 1100 can include the mixed type frequency compensating circuit 1110. The control circuit 1100 can generate the gate driving signal VG in response to a current flowing through the switching transistor MN1, the DC output voltage VOUT, and a clock signal CLK.

As described above referring to FIG. 6, the mixed type frequency compensating circuit 1110 in FIG. 8 can be viewed as a superposed circuit of the integral component sub-circuit of the voltage-amplifier-type frequency compensating circuit and a proportional component sub-circuit of the transconductance-amplifier-type frequency compensating circuit. Therefore, the capacitor CC4 included in the mixed type frequency compensating circuit 1110 can have a small capacitance, but the resistor RC4 can have a large resistance. For example, capacitor CC4 may have a capacitance of 10 pF and resistor RC4 may have a resistance of 191 kΩ. Therefore, both the capacitor CC4 and the resistor RC4 may be included in a semiconductor integrated circuit.

The frequency compensating circuit 1110 can detect the feedback voltage signal VFB. The feedback voltage signal VFB can be derived from the DC output voltage VOUT by division via resistors RF1 and RF2, and a compensated signal VC can be generated by the mixed type compensator 1110 using the VFB signal. The compensating voltage signal VC can be compared by the comparator 1130 with the detecting voltage signal VSEN1 that corresponds to the current flowing through the switching transistor MN1. The RS-type flip-flop 1140 can generate a pulse signal of which the pulse width is changed in response to the output signal of the comparator 1130 and the clock signal CLK. The output signal of the RS-type flip-flop 1140 can be buffered by the buffer 1150 and provided to a gate of the switching transistor MN1. The RS-type flip-flop 1140 can have a function of generating a pulse signal having a pulse width that is changed on the basis of the comparison of the compensating voltage signal VC and the detecting voltage signal VSEN1. Therefore, other circuits having a function of pulse-width modulation may be used instead of the RS-type flip-flop 1140.

Figure 9B:
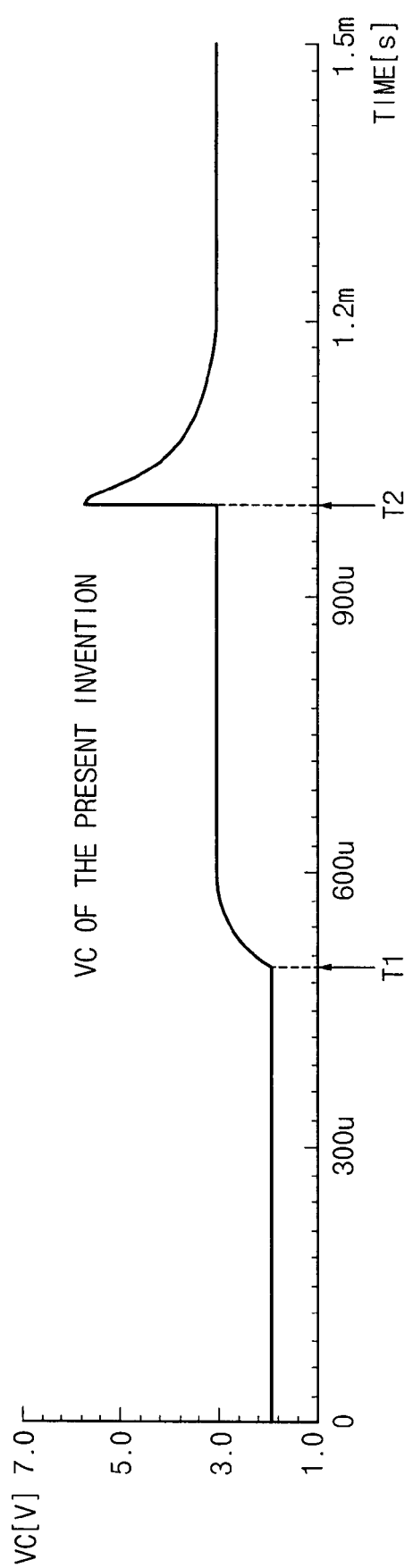

FIG. 9A and FIG. 9B are graphs illustrating waveforms of an output signal of a frequency compensating circuit according to conventional designs and the described embodiments, respectively.

FIG. 9A illustrates simulation results of a frequency compensating circuit 110 shown in FIG. 1. FIG. 9B illustrates simulation results of a frequency compensating circuit having the frequency compensating circuit 1110 as shown in FIG. 9. The waveforms shown in FIG. 9A and FIG. 9B are simulation results when a load current is changed from 600 mA to 3 A at time T1, and a reference voltage VREF1 that is applied to the transconductance amplifier 1111 and the voltage amplifier 1113 is changed from 1.15 V to 1.25 V at time T2.

As illustrated in FIG. 9A and FIG. 9B, a waveform of the output signal VC of the frequency compensating circuit 1110 that is similar to the waveform of the output signal VC of the frequency compensating circuit 110.

Figure 10A:
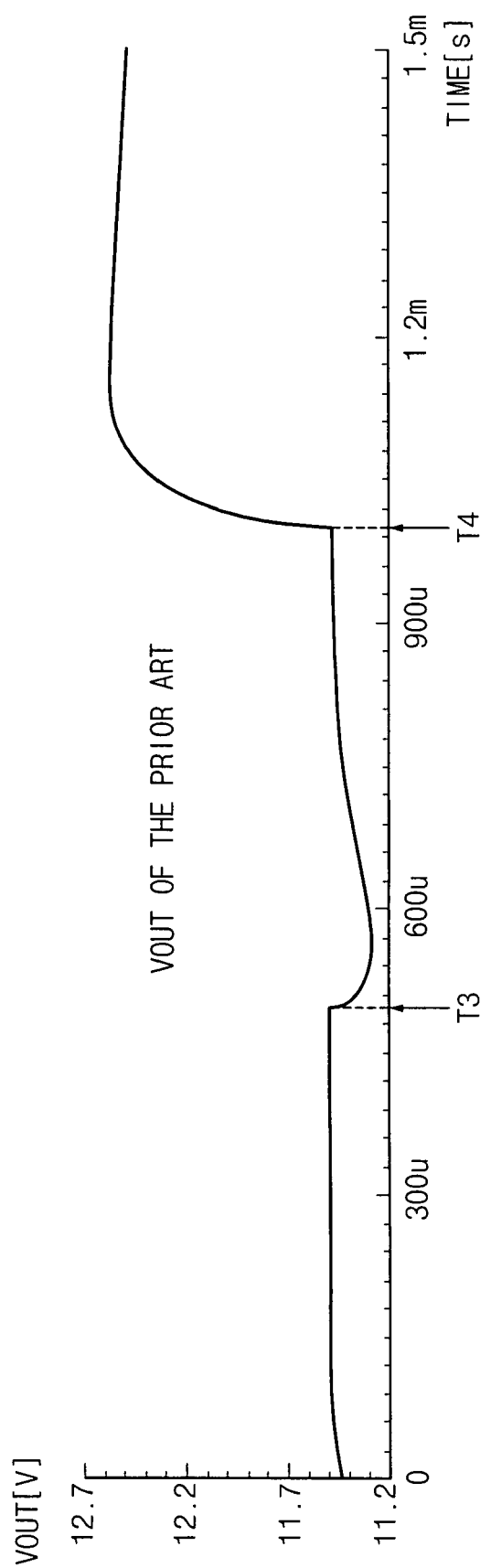
FIG. 10A and FIG. 10B are graphs illustrating waveforms of an output signal of a DC-DC converter according to the prior art and the present invention, respectively.
Figure 10B:
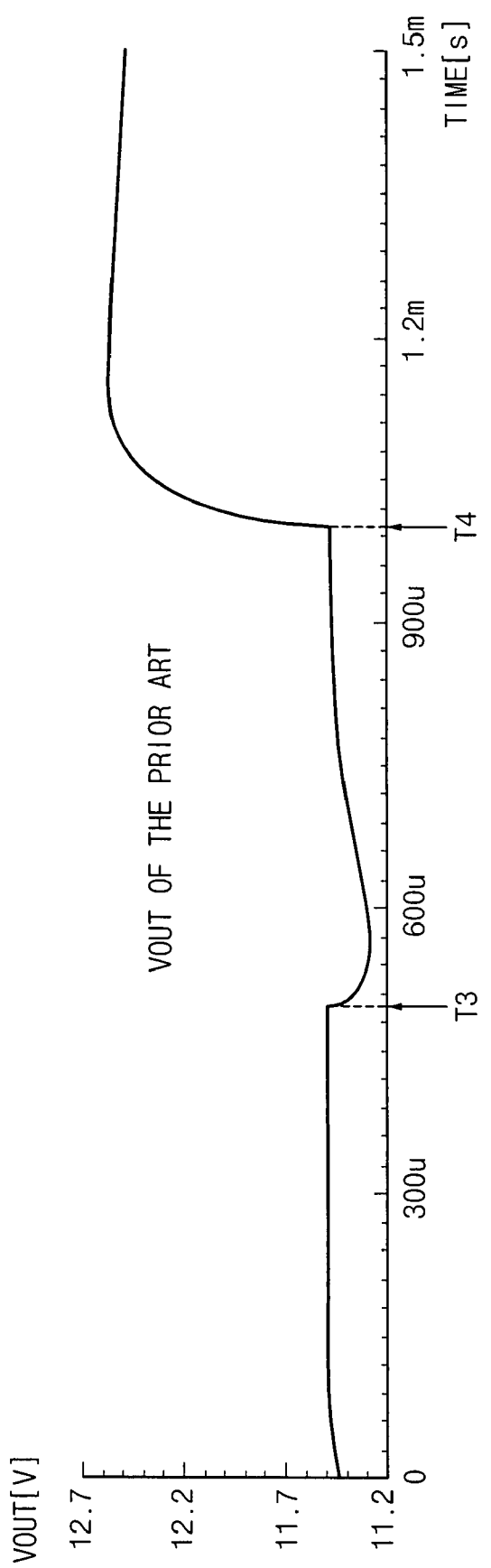

FIG. 10A and FIG. 10B are graphs illustrating waveforms of an output signal of a buck converter according to conventional designs and the above described embodiments, respectively.

FIG. 10A illustrates a waveform of an output voltage of the DC-DC converter when the simulation is performed for the DC-DC converter 100 having the frequency compensating circuit 110. FIG. 10B illustrates a waveform of an output voltage of the DC-DC converter 1000 having the frequency compensating circuit 1110 as shown in FIG. 8. The waveforms shown in FIG. 10A and FIG. 10B are simulation results when a load current is changed from 600 mA to 3 A at time T3 and a reference voltage VREF1 that is applied to the transconductance amplifier 1111 and the voltage amplifier 1113 is changed from 1.15 V to 1.25 V at time T4.

As illustrated in FIG. 10A and FIG. 10B, a waveform of a DC output voltage VOUT of the DC-DC converter 1000 that includes the mixed type frequency compensating circuit 1110 according to the above described embodiments can be very similar to the waveform of the DC output voltage VOUT of the DC-DC converter 100 that includes the frequency compensating circuit 110. Thus, the operation of the mixed type frequency compensating circuit 1110 can be similar to the conventional frequency compensating circuit 1110 in the transient response and the step response.

The mixed type frequency compensating circuit in some of the above embodiments can include an integral component sub-circuit of a voltage-amplifier-type frequency compensating circuit that amplifies the feedback voltage signal in a voltage mode and performs frequency compensation. The mixed type frequency compensating circuit in some of the above embodiments can also include a proportional component sub-circuit of a transconductance-amplifier-type frequency compensating circuit that amplifies the feedback voltage signal in a current mode and performs the frequency compensation.

Some embodiments mixed type frequency compensating circuit, having a small capacitor and a small resistor, may have a frequency characteristics that is similar to the frequency characteristics of the conventional frequency compensating circuit that includes a large capacitor or includes a large resistance resistor. Therefore, some embodiments of the mixed type frequency compensating circuit may be included in a semiconductor integrated circuit.

Further, some embodiments of the mixed type frequency compensating circuit may occupy a small area in a semiconductor integrated circuit because it utilizes a small resistance resistor or a small capacitor. Therefore, the control circuit having embodiments of the mixed type frequency compensating circuit may be conveniently implemented in semiconductor integrated circuits.

Embodiments of the mixed type frequency compensating circuit can be particularly useful in hand-held electronic systems in which a space for parts is limited.

While the present invention was described in relation to particular embodiments, persons of ordinary skill in the art will recognize that a large number of changes, substitutions and alterations may be introduced without departing from the scope of the invention, which is defined only by the appended claims.

What is claimed is:

1. A mixed type frequency compensating circuit, comprising:
   an integral component sub-circuit of a voltage-amplifier-type frequency compensating circuit configured to amplify an input voltage signal in a voltage mode and configured to perform a voltage regulation of a whole loop; and
   a proportional component sub-circuit of a transconductance-amplifier-type frequency compensating circuit configured to amplify the input voltage signal in a current mode and configured to increase a phase margin for stability;
   wherein the integral component sub-circuit comprises:
      a first resistor configured to have a first terminal to which the input voltage signal is applied;
      an operational amplifier configured to have a first input terminal coupled to a second terminal of the first resistor, a second input terminal to which the reference voltage is applied, and configured to amplify the input voltage signal in a voltage mode to generate a first amplified signal and provide the first amplified signal to a first output node; and
      a first capacitor coupled between the first output node and the first input terminal of the operational amplifier.

2. The mixed type frequency compensating circuit of claim 1, wherein the input voltage signal is generated based on an output voltage of a DC-DC converter.

3. The mixed type frequency compensating circuit of claim 1, wherein the first capacitor is configured to have a capacitance less than or equal to 1.00 pF, and is configured to be includable in a semiconductor integrated circuit.

4. The mixed type frequency compensating circuit of claim 1 further comprising:
   a third resistor coupled between the first input terminal of the transconductance amplifier and a low supply voltage; and a fourth resistor having a first terminal coupled to the first input terminal of the transconductance amplifier and a second terminal to which the output voltage of the DC-DC converter is applied.

5. The mixed type frequency compensating circuit of claim 2, wherein the proportional component sub-circuit comprises:
a transconductance amplifier configured to have a first input terminal to which the input voltage signal is applied, a second input terminal to which a reference voltage is applied, and configured to amplify the input voltage signal in a current mode to generate a second amplified signal and provide the second amplified signal to a second output node; and
a second resistor coupled between the second output node and the first output node.

6. The mixed type frequency compensating circuit of claim 5, wherein the second resistor is configured to have a resistance less than or equal to 1 MΩ, and is configured to be includable in a semiconductor integrated circuit.

7. A control circuit comprising:
a mixed type frequency compensating circuit configured to amplify a feedback voltage signal to generate a compensating voltage signal;
a current detecting circuit configured to detect a current flowing through a switching transistor to generate a first detecting voltage signal;
a comparator configured to compare a voltage level of the compensating voltage signal with a voltage level of the first detecting voltage signal to generate a comparing signal; and
a pulse-width modulating circuit configured to generate a gate driving signal based on a clock signal and the comparing signal;
wherein the mixed type frequency compensating circuit comprises:
an integral component sub-circuit of a voltage-amplifier-type frequency compensating circuit configured to amplify an input voltage signal in a voltage mode and configured to perform frequency compensation; and
a proportional component sub-circuit of a transconductance-amplifier-type frequency compensating circuit configured to amplify an input voltage signal in a current mode and configured to perform frequency compensation; and
wherein the integral component sub-circuit comprises:
a first resistor configured to have a first terminal to which the input voltage signal is applied;
an operational amplifier configured to have a first input terminal coupled to a second terminal of the first resistor, a second input terminal to which the reference voltage is applied, and configured to amplify the input voltage signal in a voltage mode to generate a first amplified signal and provide the first amplified signal to a first output node; and
a first capacitor coupled between the first output node and the first input terminal of the operational amplifier.

8. The control circuit of claim 7, wherein the pulse-width modulating circuit is configured to have a flip-flop.

9. The control circuit of claim 7 further comprising:
a buffer configured to buffer an output signal of the pulse-width modulating circuit to generate the gate driving signal.

10. The control circuit of claim 7, wherein the feedback voltage signal is generated based on an output voltage of a DC-DC converter.

11. The control circuit of claim 7, wherein the first capacitor is configured to have a capacitance less than or equal to 100 pF, and is configured to be includable in a semiconductor integrated circuit.

12. The control circuit of claim 7, wherein the mixed type frequency compensating circuit further comprises:
a third resistor coupled between the first input terminal of the transconductance amplifier and a low supply voltage; and
a fourth resistor having a first terminal coupled to the first input terminal of the transconductance amplifier and a second terminal to which the output voltage of the DC-DC converter is applied.

13. The control circuit of claim 10, wherein the proportional sub-circuit comprises:
a transconductance amplifier is configured to have a first input terminal to which the input voltage signal is applied, a second input terminal to which a reference voltage is applied, and configured to amplify the input voltage signal in a current mode to generate a second amplified signal and provide the second amplified signal to a second output node; and
a second resistor coupled between the second output node and the first output node.

14. The control circuit of claim 13, wherein the second resistor is configured to have a resistance less than or equal to 1 MΩ, and is configured to be includable in a semiconductor integrated circuit.

15. A DC-DC converter comprising:
an input node to which a DC input voltage is applied;
a switching transistor coupled between the input node and a first node, and configured to be driven in response to a gate driving signal;
a diode configured to have a cathode coupled to the first node and an anode coupled to a first supply voltage;
an inductor coupled between the first node and an output node;
a first capacitor coupled between the output node and the first supply voltage; and
a control circuit including a mixed type frequency compensating circuit, the control circuit generating the gate driving signal in response to a current flowing through the switching transistor, a voltage of the output node, and a clock signal;
wherein the mixed type frequency compensating circuit comprises:
an integral component sub-circuit of a voltage-amplifier-type frequency compensating circuit configured to amplify an input voltage signal in a voltage mode and configured to perform frequency compensation; and
a proportional component sub-circuit of a transconductance-amplifier-type frequency compensating circuit configured to amplify the input voltage signal in a current mode and configured to perform frequency compensation; and
wherein the integral component sub-circuit comprises:
a first resistor configured to have a first terminal to which the input voltage signal is applied;
an operational amplifier configured to have a first input terminal coupled to a second terminal of the first resistor, a second input terminal to which the reference voltage is applied, and configured to amplify the input voltage signal in a voltage mode to generate a first amplified signal and provide the first amplified signal to a first output node; and
a first capacitor coupled between the first output node and the first input terminal of the operational amplifier.

16. The DC-DC converter of claim 15, wherein the control circuit comprises:
a mixed type frequency compensating circuit configured to amplify a feedback voltage signal to generate a compensating voltage signal;
a current detecting circuit configured to detect a current flowing through a switching transistor to generate a first detecting voltage signal;
a comparator configured to compare a voltage level of the compensating voltage signal with a voltage level of the first detecting voltage signal to generate a comparing signal; and
a pulse-width modulating circuit configured to generate a gate driving signal based on a clock signal and the comparing signal.

17. The DC-DC converter of claim 15, wherein the proportional component sub-circuit comprises:
a transconductance amplifier configured to have a first input terminal to which the input voltage signal is applied, a second input terminal to which a reference voltage is applied, and configured to amplify the input voltage signal in a current mode to generate a second amplified signal and provide the second amplified signal to a second output node; and
a second resistor coupled between the second output node and the first output node.

18. The DC-DC converter of claim 15, wherein the mixed type frequency compensating circuit further comprises:
a voltage dividing circuit configured to divide a voltage of the output node to generate the feedback voltage signal.

19. The DC-DC converter of claim 16, wherein the pulse-width modulating circuit is configured to have a flip-flop.

20. The DC-DC converter of claim 16, wherein the control circuit further comprises:
a buffer configured to buffer an output signal of the pulse-width modulating circuit to generate the gate driving signal.

21. A method of controlling a mixed type frequency compensating circuit, the method comprising:
compensating a frequency characteristics of a feedback voltage signal using an integral component sub-circuit of a voltage-amplifier-type frequency compensating circuit; and
compensating the frequency characteristics of the feedback voltage signal using a proportional component sub-circuit of a transconductance-amplifier-type frequency compensating circuit;
wherein the integral component sub-circuit comprises:
a first resistor configured to have a first terminal to which the input voltage signal is applied;
an operational amplifier configured to have a first input terminal coupled to a second terminal of the first resistor, a second input terminal to which the reference voltage is applied, and configured to amplify the input voltage signal in a voltage mode to generate a first amplified signal and provide the first amplified signal to a first output node; and
a first capacitor coupled between the first output node and the first input terminal of the operational amplifier.

22. The method of claim 21, wherein compensating the frequency characteristics of the feedback voltage signal using the integral component sub-circuit of the voltage-amplifier-type frequency compensating circuit comprises:
amplifying the feedback voltage signal in a voltage mode.

23. The method of claim 21, wherein compensating the frequency characteristics of the feedback voltage signal using the proportional component sub-circuit of the transconductance-amplifier-type frequency compensating circuit comprises:
amplifying the feedback voltage signal in a current mode.

24. A method of controlling a DC-DC converter, the method comprising:
amplifying a feedback voltage signal in a voltage mode and in a current mode to generate a compensating voltage signal;
detecting a current flowing through a switching transistor to generate a first detecting voltage signal;
comparing a voltage level of the compensating voltage signal with a voltage level of the first detecting voltage signal to generate a comparing signal; and
generating a gate driving signal based on a clock signal and the comparing signal;
wherein the DC-DC converter comprises a mixed type frequency compensating circuit comprising:
an integral component sub-circuit of a voltage-amplifier-type frequency compensating circuit configured to amplify an input voltage signal in a voltage mode and configured to perform frequency compensation; and
a proportional component sub-circuit of a transconductance-amplifier-type frequency compensating circuit configured to amplify the input voltage signal in a current mode and configured to perform frequency compensation;
wherein the integral component sub-circuit comprises:
a first resistor configured to have a first terminal to which the input voltage signal is applied;
an operational amplifier configured to have a first input terminal coupled to a second terminal of the first resistor, a second input terminal to which the reference voltage is applied, and configured to amplify the input voltage signal in a voltage mode to generate a first amplified signal and provide the first amplified signal to a first output node; and
a first capacitor coupled between the first output node and the first input terminal of the operational amplifier.

* * * * *